US010362049B2

(12) United States Patent
Keohane et al.

(10) Patent No.: US 10,362,049 B2
(45) Date of Patent: Jul. 23, 2019

(54) SECURITY-RISK PLUGIN TO HELP TARGETED USERS INTERACT WITH WEB PAGES AND APPLICATIONS

(71) Applicant: International Business Machines Corporation, Armonk, NY (US)

(72) Inventors: Susann M. Keohane, Austin, TX (US); Gary P. Noble, Worcestershire (GB); Johnny Meng-Han Shieh, Austin, TX (US); Adam J. Storm, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 15/291,443

(22) Filed: Oct. 12, 2016

(65) Prior Publication Data

US 2018/0103055 A1    Apr. 12, 2018

(51) Int. Cl.
*H04L 29/06* (2006.01)
*G06Q 50/26* (2012.01)
(52) U.S. Cl.
CPC ....... *H04L 63/1433* (2013.01); *G06Q 50/265* (2013.01); *H04L 63/0823* (2013.01)
(58) Field of Classification Search
CPC ........... G06F 17/30861; H04L 63/0807; H04L 63/1433
USPC .......................................................... 726/25
See application file for complete search history.

(56) References Cited

U.S. PATENT DOCUMENTS

| 8,683,052 | B1* | 3/2014 | Brinskelle | ........... H04L 63/0823 709/228 |
| 2003/0055737 | A1 | 3/2003 | Pope et al. | |
| 2006/0253581 | A1* | 11/2006 | Dixon | ............... G06F 17/30861 709/225 |
| 2007/0143271 | A1* | 6/2007 | Yuval | ................ G06F 17/30864 |
| 2009/0222925 | A1* | 9/2009 | Hilaiel | ..................... G06F 21/53 726/25 |
| 2010/0275024 | A1* | 10/2010 | Abdulhayoglu | .... G06F 21/6218 713/175 |
| 2013/0110525 | A1* | 5/2013 | Whittier | ................. G06Q 10/00 705/1.1 |
| 2013/0276125 | A1* | 10/2013 | Bailey | ................. H04L 63/1433 726/25 |

(Continued)

OTHER PUBLICATIONS

Anonymous, "Extended Validation (EV) SSL Certificates," https://www.digicert.com/ppc/extended-validation.htm?gclid=CJbolsWCwcsCFRY7gQodgvkIDQ (Date not available) (Background).

(Continued)

*Primary Examiner* — Bryan F Wright
(74) *Attorney, Agent, or Firm* — Patterson + Sheridan, LLP

(57) ABSTRACT

The present disclosure relates to techniques for helping targeted users determine whether it is safe to supply personal information requested by a web site. In one embodiment, a method generally includes extracting textual content from a web page that requests information from a user and determining, based on the textual content, the type of information requested. A service type the web page provides is also determined based on the textual content. The service type and the information type are then compared to a set of predefined rules to determine a risk level associated with the web page. A visual indicator of the risk level is then displayed with the web page.

13 Claims, 7 Drawing Sheets

(56) References Cited

U.S. PATENT DOCUMENTS

2014/0195437 A1  7/2014  Feng
2015/0074390 A1* 3/2015  Stoback .............. H04L 63/1483
                                                    713/156
2015/0100491 A1  4/2015  Fote
2016/0337133 A1* 11/2016 Yiu ....................... H04L 9/3268
2017/0012964 A1* 1/2017  Ceppi ................ H04L 63/0807

OTHER PUBLICATIONS

Fernandes et al. "Android UI Deception Revisited: Attacks and Defenses." [PDF] from ifca.ai (Date not Available) (Background.
Zheng et al. "Chinese consumer perceived risk and risk relievers in e-shopping for clothing." Journal of Electronic Commerce Research 13.3 (2012): 255. (Related).
Forsythe et al., "Consumer patronage and risk perceptions in Internet shopping." Journal of Business Research 56.11 (2003): 867-875. (Background).

* cited by examiner

SECURITY-RISK PLUGIN TO HELP TARGETED USERS INTERACT WITH WEB PAGES AND APPLICATIONS

BACKGROUND

The population of elderly people worldwide has risen over the past few decades as access to modern medical care has improved and people have become more aware of the benefits of proper nutrition and exercise. Many elderly people remain active in their communities as leaders, mentors, grandparents, and voters. Furthermore, many elderly people continue to be active consumers that purchase a variety of goods and services. The market for goods and services targeted to the elderly is poised to grow as the population of elderly people continues to increase.

Since they came of age in a different era, some older individuals are less familiar with modern technology than younger people. In particular, since computer technologies have advanced very rapidly over the past few decades, many elderly people have struggled to keep their knowledge of modern technology up to date. Many businesses and other institutions are adopting modern technologies to manage records, sales, and advertising and are phasing out old pen-and-paper documents. This shift toward modern technologies, such as paperless systems and websites, often poses a challenge for elderly patrons who are uncomfortable when presented with unfamiliar technology and who are incredulous about Internet security.

SUMMARY

One embodiment disclosed herein includes a method for assisting targeted users, such as elderly people, to fill out forms on web pages via a browser plug-in. The method generally includes scraping text from a form presented on a web page. The form contains one or more fields for a user to enter information. The method also generally includes determining, based on the scraped text, one or more types of information the form is designed to collect from the user; determining, based on metadata, an extended validation (EV) certificate, or a uniform resource locator (URL) associated with the web page, a type of services that the web page provides; comparing the type of services and the one or more types of information to a set of predefined rules; determining, based on the comparison, a risk level for the form; and displaying a visual indicator of the risk level for the form with the web page.

Another embodiment includes non-transitory computer-readable storage medium containing instructions that, when executed by one or more processors, perform an operation for assisting targeted users, such as elderly people, to fill out forms on web pages via a browser plug-in. The operation generally includes scraping text from a form presented on a web page. The form contains one or more fields for a user to enter information. The operation also generally includes determining, based on the scraped text, one or more types of information the form is designed to collect from the user; determining, based on metadata, an extended validation (EV) certificate, or a uniform resource locator (URL) associated with the web page, a type of services that the web page provides; comparing the type of services and the one or more types of information to a set of predefined rules; determining, based on the comparison, a risk level for the form; and displaying a visual indicator of the risk level for the form with the web page.

Still another embodiment includes one or more processors and memory storing one or more applications that, when executed on the one or more processors, perform an operation for assisting targeted users, such as elderly people, to fill out forms on web pages via a browser plug-in. The operation generally includes scraping text from a form presented on a web page. The form contains one or more fields for a user to enter information. The operation also generally includes determining, based on the scraped text, one or more types of information the form is designed to collect from the user; determining, based on metadata, an extended validation (EV) certificate, or a uniform resource locator (URL) associated with the web page, a type of services that the web page provides; comparing the type of services and the one or more types of information to a set of predefined rules; determining, based on the comparison, a risk level for the form; and displaying a visual indicator of the risk level for the form with the web page.

While the embodiments disclosed herein describe the concepts of the disclosure in terms of a plug-in for a web browser, these concepts can readily be adapted for use in other contexts where targeted users interact with computers. For example, principles disclosed herein can be applied to determine risk levels for applications and files (e.g., executables) without departing from the spirit and scope of the disclosure.

DETAILED DESCRIPTION

Figure 1:
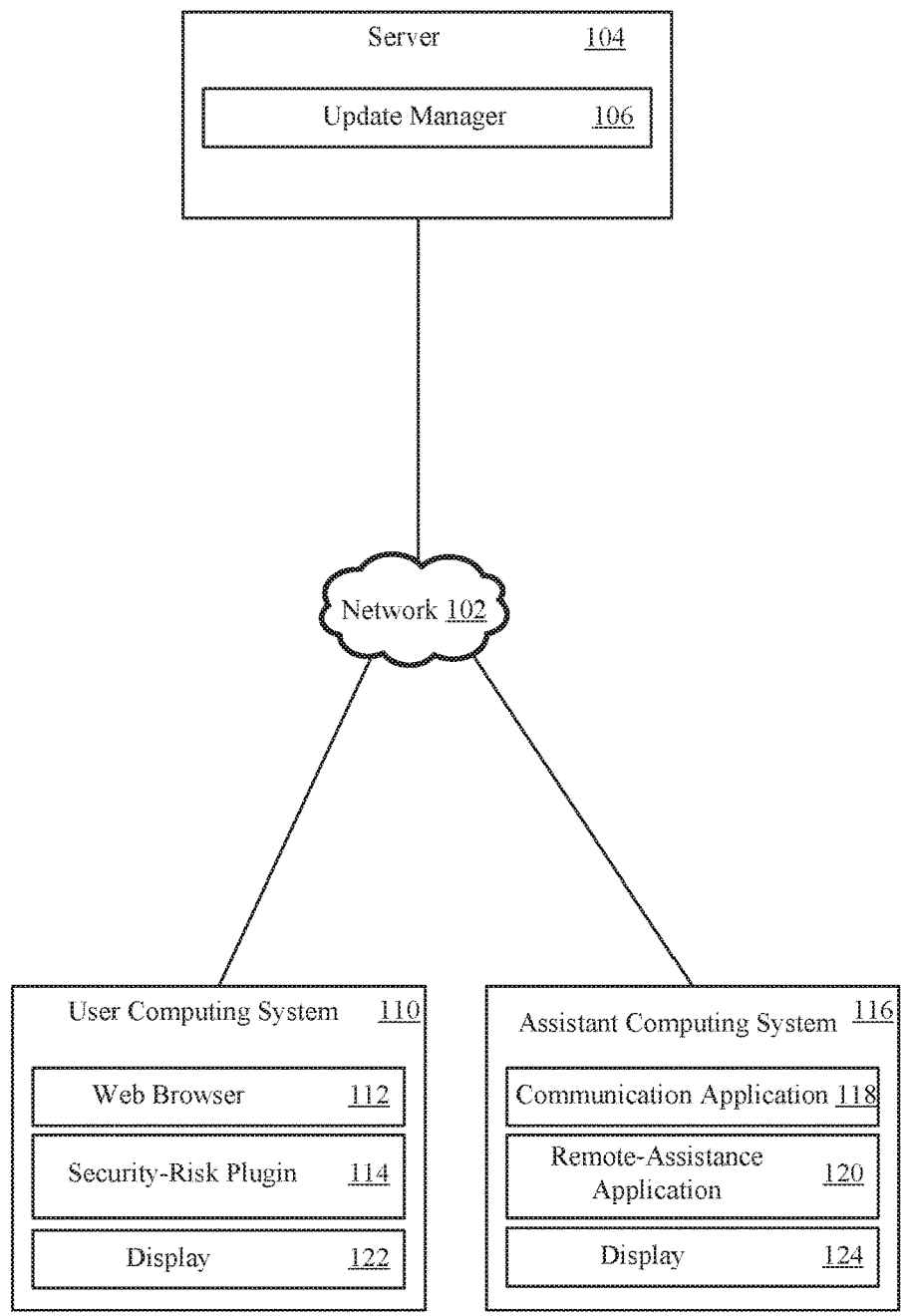
FIG. 1 illustrates a computing environment in which techniques of the present disclosure are applied, according to one embodiment.

Embodiments presented herein describe techniques for assisting targeted users to fill out forms on web pages via a plug-in for a web browser. When a targeted user (e.g., an elderly person) visits a web page configured to receive user input, a browser plugin extracts text content from the web page. Based on the text content, the browser plugin determines a type of information elements on the web page are designed to collect from the user and a type of services the web page offers. The browser plugin then determines a risk level for at least one element on the web page that is designed to receive user input and displays a visual indicator of the risk level.

If the risk level exceeds a predefined threshold, the plugin may disable the element so that the user cannot use the element to provide input. The plugin sends a message to a designated assistance provider requesting assistance on behalf of the user. The designated assistance provider may communicate directly with the user (e.g., via a messaging application or by telephone). The plugin may stream a view of a screen that the user is viewing and may even allow the designated assistance provider to control the user's computer remotely. The designated assistance provider may direct the plugin to re-enable the disabled elements, if desired. The plugin may also associate the risk level with the web page or element and store the association with the user's browsing history so that the risk level does not have to be recalculated when the user revisits the web page. Furthermore, the plugin may also store any restrictions or directives the designated assistance provider has set for the web page. For example, if the designated assistance provider directs that an element on the page should not be disabled, the plugin can store this directive so the plugin does not have to request assistance each time the user visits the web page.

Other embodiments presented herein describe techniques for assisting targeted users to interact with computer applications. When an application interface designed to collect information from a targeted user is opened, an application plugin extracts text content from the interface. Based on the text content, the application plugin determines a type of information the interface is designed to collect from the user and a type of services the application offers. The application plugin then determines a risk level for at least one element of the interface and displays a visual indicator of the risk level.

If the risk level exceeds a predefined threshold, the plugin may disable the element so that the user cannot use the element to provide input. The plugin sends a message to a designated assistance provider requesting assistance on behalf of the user. The designated assistance provider may communicate directly with the user (e.g., via a messaging application or by telephone). The plugin may stream a view of a screen that the user is viewing and may even allow the designated assistance provider to control the user's computer remotely. The designated assistance provider may direct the plugin to re-enable the disabled elements, if desired. The plugin may also associate the risk level with the application or element and store the association locally so that the risk level does not have to be recalculated when the user reopens the application. Furthermore, the plugin may also store any restrictions or directives the designated assistance provider has set for the application. For example, if the designated assistance provider directs that an element on the application interface should not be disabled, the plugin can store this directive so the plugin does not have to request assistance each time the user views the application interface.

FIG. 1 illustrates a computing environment 100 in which techniques of the present disclosure are applied, according to one embodiment. As shown, a server 104, a user computing system 110, and a trusted assistant computing system are connected to a network 102. A targeted user browses the Internet using the web browser 112 that is installed on the user computing system 110. The security-risk plugin 114 is also installed on the user computing system as a plugin for the web browser 112. The server 104 includes an update manager 106 that periodically sends software updates and updated lists of malicious websites to the security-risk plugin 114.

The targeted user loads a web page of a web site in the web browser 112. The web page is shown on the display 122 and includes a form requesting information from the user. The security-risk plugin 114, upon detecting that the web page includes a form, determines what types of information the form is requesting from the user (e.g., such as the user's name, home address, telephone number, birthdate, credit card number, or social security number). In addition, the security-risk plugin 114 also determines what types of services the web site offers.

The security-risk plugin 114 determines a risk level for the form by comparing the types of information requested by the form with the types of services offered by the website. The security-risk plugin 114 displays an indication of the risk level on the form or the page. The indication may overlay (e.g., with a highlighting color of a color-coding scheme that maps risk levels to colors) one or more elements of the form or the web page or may be displayed in a toolbar or a sidebar.

In addition, the security-risk plugin 114 displays a clickable element (e.g., such as a link, an icon, or a button) that allows the user to request assistance. When the user clicks on the clickable element, the security-risk plugin 114 opens a communication channel with the communication application 118 that runs on the assistant computing system 116 via the network 102. The user then communicates electronically with a trusted assistant (e.g., a family member that is Internet savvy) that uses the communication application 118 on the assistant computing system 116. The trusted assistant can provide advice, explanations, and recommendations via the communication application 118 in response to questions the user may have about the form or the web page. Furthermore, the user can also use the clickable element to enable screen sharing. Using the remote assistance application 120, the trusted assistant can use the display 124 to view what the user sees on the display 122. The user may also enable the trusted assistant to control the user computing system 110 remotely through the remote-assistance application 120.

If the risk level meets a first predefined threshold, the security-risk plugin 114 displays a warning message for the user. The security-risk plugin 114 may wait for the user to indicate that the warning message has been read before allowing the user to continue interacting with the form or some other element on the web page.

If the risk level meets a second predefined threshold, the security-risk plugin 114 disables one or more buttons, links, or fields associated with the form on the web page and opens a communication channel with the communication application 118 without seeking user approval. The security-risk plugin 114 sends a message to the trusted assistant via the communication application 116 to request assistance. The security-risk plugin 114 may also enable screen sharing and allow the trusted assistant to control the user computing system 110 remotely through the remote-assistance application 120. The trusted assistant then communicates with the user via the communication application 118 to assess the situation. If the trusted assistant ultimately determines that it is in the user's best interest not to provide information to the web page, the trusted assistant indicates that the web page should be added to a list of prohibited web pages that the security-risk plugin 114 maintains. On the other hand, if the trusted assistant decides that the web page is acceptably safe, the trusted assistant sends an unlock indication to the security-risk plugin 114. The security-risk plugin 114 re-enables one or more buttons, links, or fields associated with the form on the web page and may the add the web page to a list of approved web pages. The user then resumes filling out the form or otherwise interacting with the web page.

Figure 2:
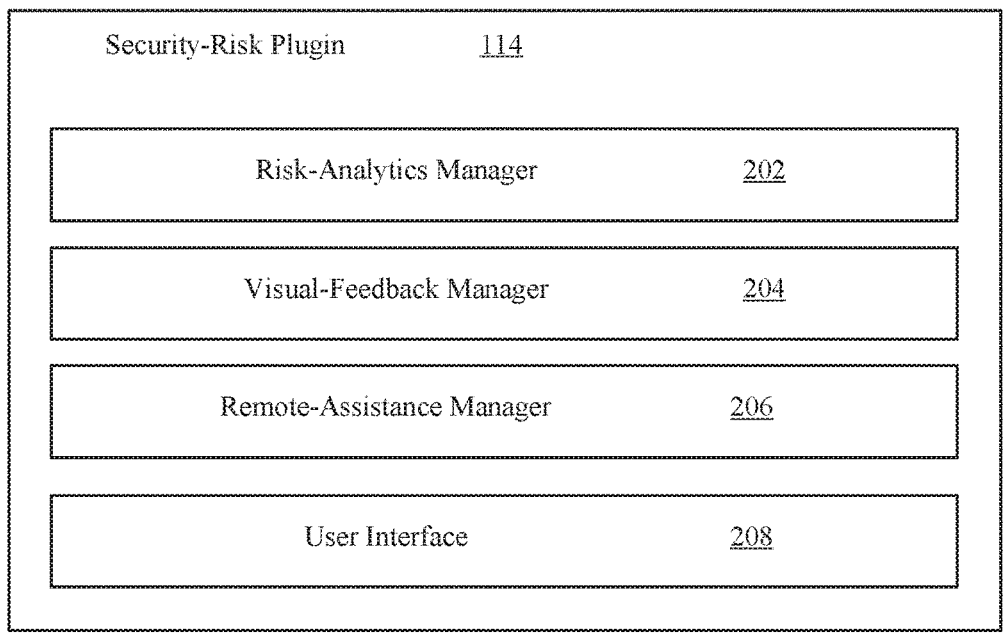
FIG. 2 illustrates a detailed view of the security-risk plugin, according to one embodiment.

FIG. 2 illustrates a detailed view of the security-risk plugin 114, according to one embodiment. The security-risk plugin 114 includes a risk-analytics manager 202, a visual-feedback manager 204, a remote-assistance manager 206, and a user interface 208.

The risk-analytics manager 202 is responsible for determining risk levels for web pages that the user visits. When the user visits a web page of a web site, the risk-analytics manager 202 analyzes aspects of the web page and the web site, such as text and metadata found on the web page, an extended validation (EV) certificate associated with the web site, or a uniform resource locator (URL) associated with the web site in order to determine what types of services that the web site provides.

Furthermore, the risk-analytics manager 202 detects when a web page requests information from the user. For example, if the web page is written in Hypertext Markup Language (HTML), the risk-analytics manager 202 can detect that the source HTML of the web page contains "input" tags. The risk-analytics manager 202 can then identify text on the web page or parameters associated with the input tags (e.g., the "type" parameter and the "name" parameter) to determine what type of information the web page requests from the user. For example, if the web page includes an "input" tag associated with a "name" parameter whose value is "birthdate," the risk-analytics manager 202 may conclude that the web page is asking for the user's birthdate. Similarly, if the "input" tag is proximal to text that reads "Date of Birth," may also conclude that the web page is asking for the user's birthdate. The risk-analytics manager 202 may include a mapping that maps certain words, acronyms, regular expressions, or phrases to certain types of information. Such a mapping may, for example, map "DOB," "birthday," "date of birth," "birth date," "born on," and comparable words, acronyms, or phrases to a birthdate information type.

The risk-analytics manager 202 also determines what type of services the web site offers. For example, the risk-analytics manager 202 may include a mapping that maps website URLs or regular expressions to one or more service types. If a website's URL does not map to any service types, the risk-analytics manager 202 can mine text from the web page and the website URL and use the mined text to infer a type of service that the website offers. For example, the mined text may be used as input for a machine-learning model that has been trained to use infer service types for web pages.

Once the risk-analytics manager 202 has determined type of information the web page requests and the type of services the web site offers, the risk-analytics manager 202 determines a risk level for the web page (or for some element of the web page, such as a form or a field). The risk-analytics manager 202 may determine the risk level by applying predefined rules based on the service types provided by the website and the information types requested by the website. One predefined rule may, for example, specify that the risk level is high for a web page that requests the user's social security number (information type) in order to provide a daily horoscope (service type). In another example, another predefined rule may specify that the risk level is low for a web page that requests the user's birthdate (information type) in order to provide a quote for a life insurance policy (service type).

The visual-feedback manager 204 is responsible for displaying an indication of the risk level to the user and, when applicable, warning messages. In one example, the visual-feedback manager 204 displays the indication in a toolbar or a sidebar. The indication may be textual (e.g., a number on a predefined scale from 1 to 100 or a word such as "low," "medium," or "high") or graphical (e.g., a gauge, a thermometer-type bar, or a light of variable color). In another example, the indication may be an overlay that the visual-feedback manager 204 displays over one or more elements of the web page or the form. For example, the overlay may be a highlight color that overlays a field; green may indicate a low risk level, while red may indicate a high risk level. The overlay may also be a colored frame that encircles the field or an icon that is displayed next to the field.

The remote-assistance manager 206 is responsible for coordinating screen sharing and remote assistance with the trusted assistance provider. The user can invoke screen sharing by clicking on the assistance button 210 provided by the user interface 208. Alternatively, the risk-analytics manager 202 may invoke remote-assistance manager 206 without user input upon determining that the risk level for the web page exceeds a predefined threshold. Once invoked, the remote-assistance manager 206 can activate screen sharing by sending a streaming view of a screen that is being displayed to the user to a device operated by a designated assistance provider. If the user (or the risk-analytics manager, if the risk level meets the predetermined threshold) also authorizes the trusted assistant to control the user's computing device, the remote-assistance manager 206 may also be configured to receive mouse and keyboard input from the trusted assistant's device over the internet and use the mouse and keyboard input to control the user's computing device.

The user interface 208 is responsible for allowing the user to input preferences and change settings of the security-risk plugin 114. The user interface 208 may be a graphical user interface (GUI) that allows the user to specify preferences regarding what types of visual indications are shown by the visual-feedback manager 204. Furthermore, the user interface 208 may allow the user to edit the predefined risk-level threshold and the predefined rules used by the risk-analytics manager 202 and any lists of prohibited or approved websites. The user interface 208 also provides the assistance button 210 that the user can click to request help from the trusted assistant.

Figure 3:
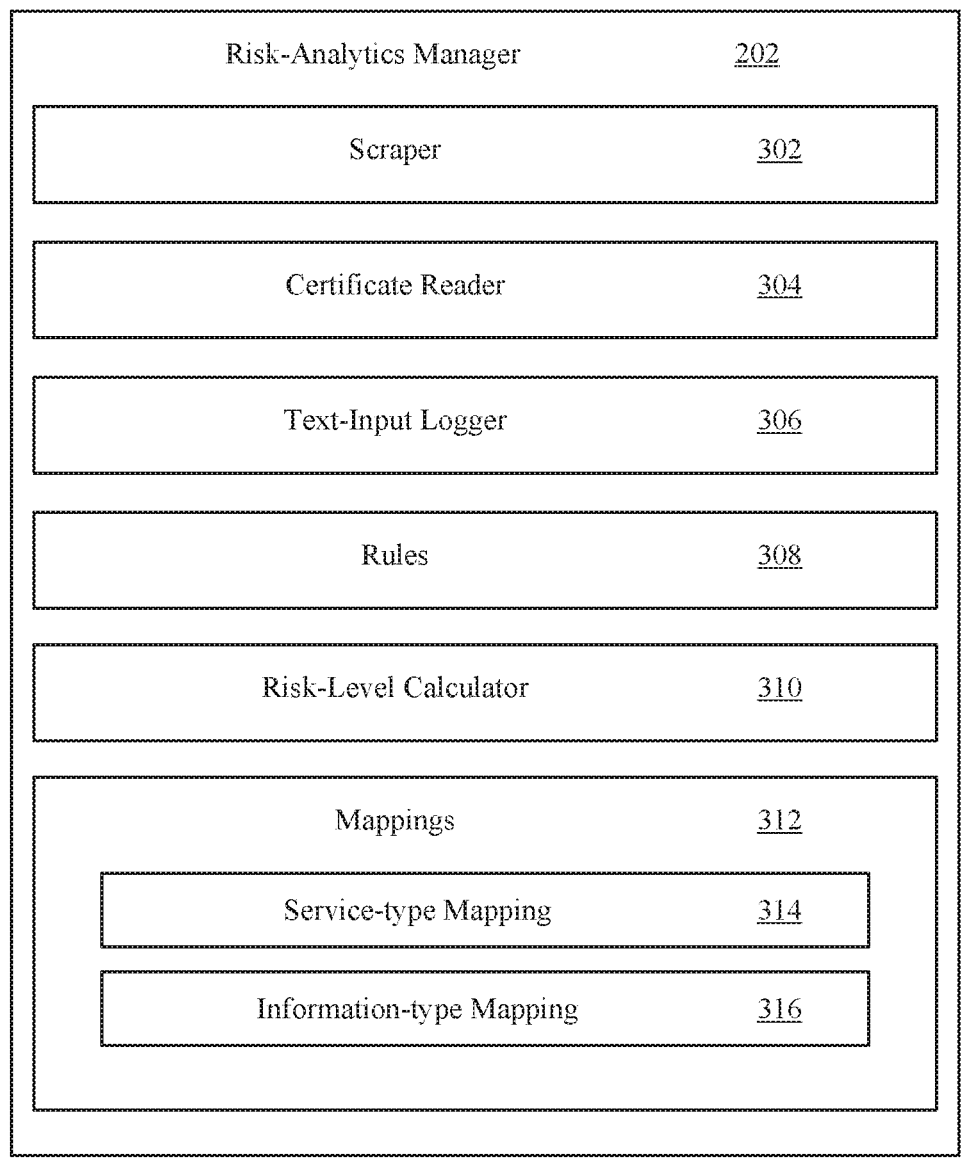
FIG. 3 illustrates a detailed view of the risk-analytics manager, according to one embodiment.

FIG. 3 illustrates a detailed view of the risk-analytics manager 202, according to one embodiment. The risk-analytics manager 202 includes a scraper 302, a certificate reader 304, a text-input logger 306, a rule manager 308, a risk-level calculator 310, and mappings 312. The service-type mapping 314 maps words, acronyms, phrases, URLs, or regular expressions to service types, while the information-type mapping 316 maps words, acronyms, phrases, regular expressions, or indices to types of information that a web site may request.

The scraper 302 scrapes text from a web page. The scraper 302 can scrape both static text (such as HTML text and metadata and the URL of the web page) and dynamic content (e.g., that is loaded or generated dynamically with JavaScript) from the web page. The risk-analytics manager 202 can use the scraped text to help determine what types of services the web page offers, what type of information the web page requests, and what risk level to assign to the web page (or to one or more elements on the web page).

Specifically, the risk-analytics manager 202 compares text scraped from the web page to the service-type mapping 314 to determine a set of services types that the web page offers. In one example, the service-type mapping 314 includes an entry that maps the exact URL of the web page to a type of service. The URL may also match a regular expression found in an entry that maps the regular expression to a type of service. For example, if the URL of the web page is https://fafsa.ed.gov and an entry in the service-type mapping 314 maps the regular expression /^(https?:Wfafsa\..*\.gov) to one or more service types (e.g., "financial aid" and "education"), the URL https://fafsa.ed.gov maps to the one or more service types by matching the regular expression.

The risk-analytics manager 202 may also compare other text scraped from the website to the service-type mapping 314. The risk-analytics manager 202 adds service types listed in any matching entries to the set of service types that the web page offers.

The certificate reader 304 determines whether an EV certificate is associated with the web page. If there is an EV certificate associated with the web page, the certificate reader 304 provides the EV certificate to the scraper 302. The scraper 302 scrapes text from the EV certificate. The risk-analytics manager 202 compares the text scraped from the certificate to the service-type mapping 314 to identify service types the web page provides.

The risk-analytics manager 202 also compares text scraped from the web page to the information-type mapping 316 to determine a set of information types that the web page requests from a user. In one embodiment, the risk-analytics manager 202 specifically compares scraped text that is associated with input tags on the web page (e.g., parameter values, page or form titles and headers, and text that is displayed near input fields) to the information-type mapping 316 to determine a set of information types requested by the web page. For example, if an input field on the web page is named "born on" and an entry in the information-type mapping 316 maps the phrase "born on" to a date-of-birth information type, the risk-analytics manager 202 adds the date-of-birth information type to the set of information types that the web page requests from a user. Even if there is not a verbatim entry for "born on" in the information-type mapping 316, "born on" may still match a regular expression that maps to the date-of-birth information type in the information-type mapping 316.

The text-input logger 306 keeps track of what a user is typing into fields on the web page. The risk-analytics manager 202 can also compare text that is tracked by the text-input logger 306 to the information-type mapping 316 to help determine a set of information types requested by the web page, particularly if the web page includes uses an image to label a field and text from the image is not immediately available. For example, if the text-input logger 306 determines that eleven characters that a user has typed into a field are 555-55-5555, the risk-analytics manager 202 can detect that these eleven characters match the regular expression ^[:digit:]{3}-?[:digit:]{2}-?[:digit:]{4}$ that maps to a social-security-number information type in the information-type mapping 316. The risk-analytics manager 202 then adds the social-security-number information type to the set of information types that the web page requests.

Once the risk-analytics manager 202 manage has identified service types the web page offers and information types the web page requests, the risk-level calculator 310 compares the service types and the information types to the rules 308. Those of skill in the art will appreciate that there are many different ways of storing or codifying the rules 308 in a computer-readable format. The rules 308 are logical structures that map combinations of service types and information types to risk levels. For example, one rule may map the combination of service type "banking" and the information type "bank account number" to a risk level of 1 (e.g., on a scale from 1 to 10, though other numeric and non-numeric scales are possible). Another rule may map the combination of service type "entertainment" and information type "birthdate" to a risk level of 3. Some rules may map combinations that include more than one service type or more than one information type to risk levels. For example, a rule could map the combination including service types "banking" and "financial management" and including information types "phone number" and "home address" to a risk level of 2.

In some embodiments, the rules 308 also include rules that apply to words or phrases scraped from the web page. For example, a rule may specify that the phrase "you have been selected" maps to a risk level of 8. The risk-level calculator 310 may compare text the scraper 302 scrapes from the web page to this type of rule.

In some embodiments, the risk-level calculator 310 may assign individualized risk levels to different elements on web page, such as forms, fields, links, buttons, and check boxes. In one example, a web page may contain a form with fields labeled "email address," "first name," "last name," "date of birth," and "home address." The web page may offer a coupon service through the mail. The risk-level calculator 310 may determine that the risk level for the field labeled "date of birth" is high, while the risk levels for the other fields in the form are low. The risk-level calculator 310 may also determine that the risk level for an advertisement link found on the web page is high (e.g., by comparing a URL in the link to the rules 308).

In some cases, the risk-level calculator 310 may detect that multiple rules apply to a web page or element therein. In one embodiment, the risk-level calculator 310 can determine the respective risk levels that each applicable rule would assign to the web page or element. The risk-level calculator 310 can then assign the highest determined risk level to the web page or element. Alternatively, risk-level calculator 310 may compute a weighted average of the determined risk levels and assign the weighted average as the final risk level for the web page or element.

Figure 4:
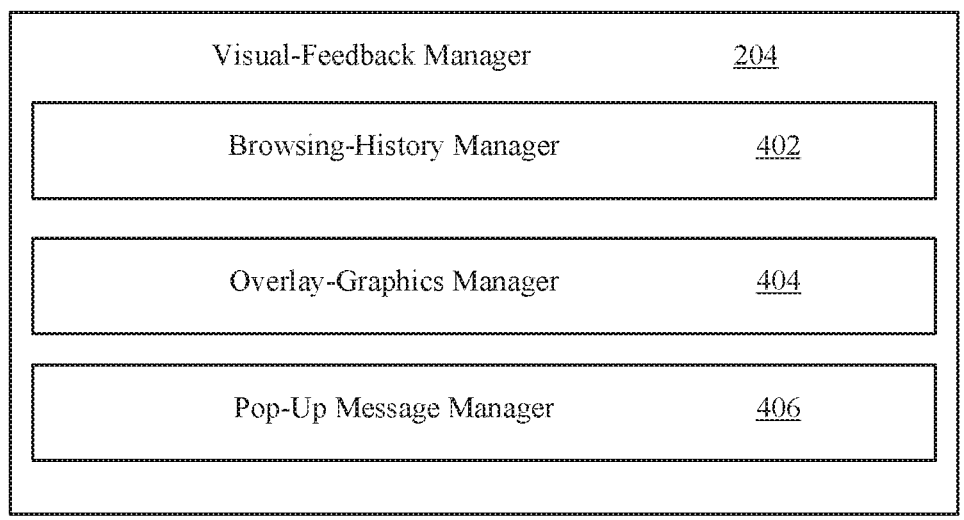
FIG. 4 illustrates a detailed view of the visual-feedback manager, according to one embodiment.

FIG. 4 illustrates a detailed view of the visual-feedback manager 204, according to one embodiment. The visual-feedback manager 204 includes a browsing-history manager 402, an overlay-graphics manager 404, and a pop-up message manager 406.

The overlay-graphics manager 404 is responsible for displaying graphical risk-level indications. If there are several input fields displayed on a web page and each input field has a respective risk level, the overlay-graphics manager 404 can highlight each input field with a color that indicates the respective risk level of the field. For example, the overlay-graphics manager 404 may highlight a field for a credit card number in red to indicate that the risk level of providing such information to this web page is high. On the other hand, the overlay-graphics manager 404 may highlight a field for a zip code in green to indicate that the risk level of providing such information to this web page is low.

The pop-up message manager 406 is responsible for displaying warning messages when risk levels associated with elements on a web page are high (e.g., exceeding a predefined threshold). For example, if a user's mouse icon hovers over a field with a high risk level, the pop-up message manager 406 can display a warning message to the user. In some embodiments, the pop-up message manager 406 may prevent the user from typing in the field until the user has clicked on button to acknowledge the warning message has been read.

The browsing-history manager 204 keeps track of the user's browsing history and clickstreams. In addition, the browsing-history manager 204 keeps track of risk levels that have been assigned to elements on web pages. The browsing-history manager 204 provides these risk levels to the overlay-graphics manager 404 and the pop-up message manager 406. The browsing-history manager 204 can also record answers the trusted assistant has provided to questions and permissions the trusted assistant has granted and associate those answers and permissions with web pages so that the user does not have to request assistance for the same issue more than once.

Figure 5:
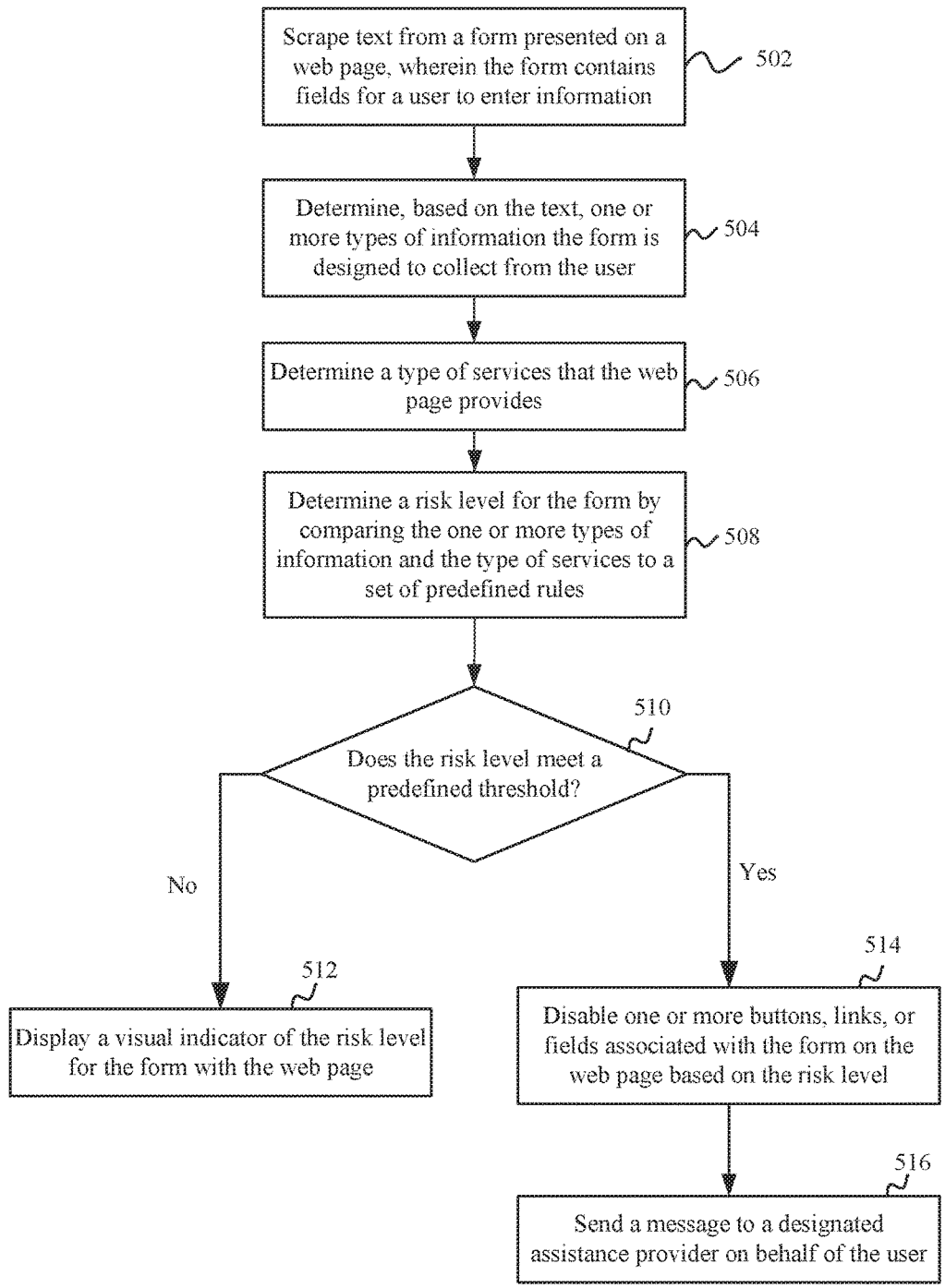
FIG. 5 illustrates a method for a security-risk plugin that helps targeted users decide what information to provide to web pages, according to one embodiment.

FIG. 5 illustrates a method 500 for a security-risk plugin that helps targeted users decide what information to provide to web pages, according to one embodiment. At step 502, a security-risk plugin scrapes text from an electronic form presented on a web page, wherein the form contains one or more fields for a user to enter information.

At step 504, the security-risk plugin determines, based on the scraped text, one or more types of information the form is designed to collect from the user. The security-risk plugin may, for example, compare the scraped text to an information-type mapping to determine a set of information types that the web page requests from a user.

At step 506, the security-risk plugin determines a type of services that the web page provides (e.g., based on metadata, an extended validation (EV) certificate, or a uniform resource locator (URL) associated with the web page). For example, the security-risk plugin may compare text scraped from the web page or an EV certificate to a service-type mapping to determine a set of services types that the web page offers.

At step 508, the security-risk plugin determines a risk level for the form by comparing the one or more types of information and the type of services to a set of predefined rules.

At step 510, the security-risk plugin determines whether the risk level meets a predefined threshold. If the risk level does not meet the threshold, the security-risk plugin proceeds to step 512. If the risk level meets the threshold, the security-risk plugin proceeds to step 514.

At step 512, the security-risk plugin displays a visual indicator of the risk level for the form with the web page. The visual indicator may overlay one or more elements of the form or the web page or may be displayed in a toolbar or a sidebar.

At step 514, the security-risk plugin disables one or more buttons, links, or fields associated with the form on the web page based on the risk level. For example, the security-risk plugin may prevent the user from clicking a submit button, from entering text into a field, or from clicking on a link. In addition, the security-risk plugin may display a warning message to the user based on the risk level.

At step 516, the security-risk plugin sends a message to a designated assistance provider requesting help on behalf of the user. For example, the security-risk plugin may request that the designated assistance provider communicate with the user through a messaging application or a voice connection to provide advice. The security-risk plugin may stream a view of the screen the user is viewing to the designated assistance provider and optionally allow the designated assistance provider to remotely control the device the user is using to access the web page.

Furthermore, in some embodiments, security-risk plugin may prompt the designated assistance provider to grant (or decline to grant) approval for the disabled buttons, links, or fields to be re-enabled. The security-risk plugin re-enables and buttons, links, or fields approved by the designated assistance provider.

Figure 6:
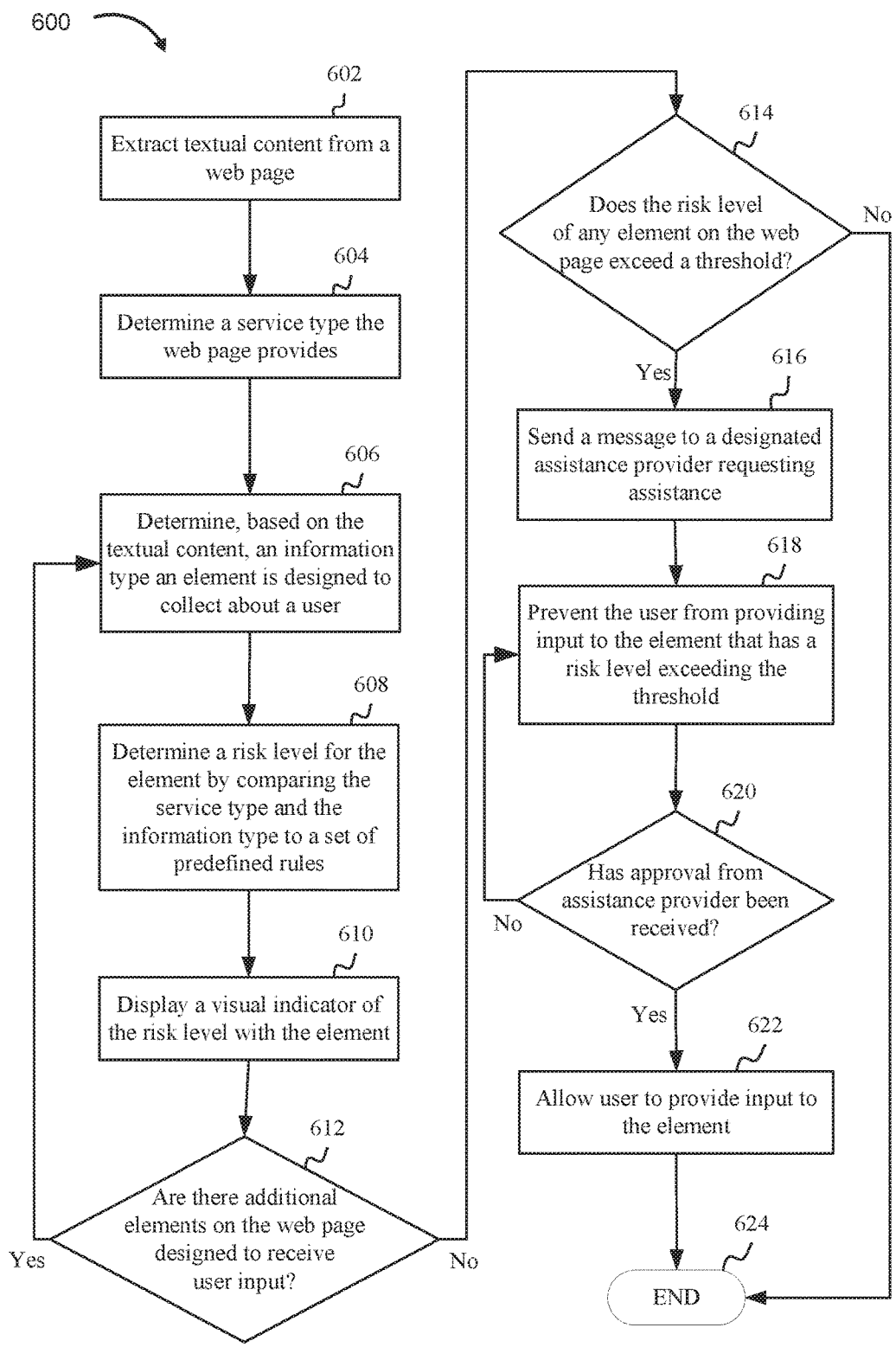
FIG. 6 illustrates a process for a security-risk plugin that helps targeted users decide what information to provide to web pages, according to one embodiment.

FIG. 6 illustrates a method 600 for a security-risk plugin that helps targeted users decide what information to provide to web pages, according to one embodiment. At step 602, the security-risk plugin extracts textual content from a web page that has been loaded into a browser. The web page includes one or more elements, such as fields, that request information or some other type of input from a user.

At step 604, the security-risk plugin determines a service type the web page offers based on the textual content. The security-risk plugin may, for example, compare the textual content to a mapping that correlates words, acronyms, regular expressions, or phrases with service types.

At step 606, the security-risk plugin determines, based on the textual content, an information type an element on the web page is designed to collect about the user. The security-risk plugin may, for example, compare the textual content that is associated with the element (e.g., a label for the element or text located near the element) to a mapping that correlates words, acronyms, regular expressions, or phrases with information types.

At step 608, the security-risk plugin determines a risk level for the element by comparing the service type and the information type to a set of predefined rules. The predefined rules may be logical structures that map combinations of service types and information types to risk levels.

At step 610, the security-risk plugin displays a visual indicator of the risk level with the element. The indicator may overlay the element or be may be displayed alongside the element on the web page.

At step 612, the security-risk plugin determines whether there are any additional elements on the web page designed to receive user input. If there is an additional element meeting this criterion, the security-risk plugin repeats steps 606 through 610 for the additional element. Otherwise, the security-risk plugin proceeds to step 612. In this manner, the security-risk plugin can determine a respective individualized risk level for each element of the web page. In one embodiment, the security-risk plugin uses a coloring scheme and highlights each respective element with a respective color that indicates the respective individualized risk level.

At step 614, the security-risk plugin determines whether any element on the web page has a risk level exceeding a predefined threshold. If no element on the web page has a risk level exceeding the threshold, the security-risk indicator proceeds to step 624. If an element on the web page does have a risk level exceeding the threshold, the security-risk plugin proceeds to step 616.

At step 616, the security-risk plugin sends a message to a designated assistance provider requesting assistance with the element that has the risk level exceeding the threshold. At step 618, the security-risk plugin prevents the user from providing input to the element that has the risk level exceeding the threshold. The designated assistance provider may respond by sending an approval message requesting that the user be allowed to provide input to the element. The designated assistance provider may also respond by sending a disapproval message requesting that the security-risk plugin continue preventing the user from providing input to the element.

In one embodiment, the security-risk plugin may also activate a remote assistance mode that allows the designated assistance provider to control a mouse cursor for the user remotely. The security-risk plugin may also stream a view of a screen that is being displayed to the user to the designated assistance provider.

At step 620, the security-risk plugin determines whether an approval message for the element has been received from the designated assistance provider. If an approval message has not been received, the security-risk plugin continues to prevent the user from providing input to the element as in step 618. If an approval message has been received, the security-risk plugin proceeds to step 622.

At step 622, the security-risk plugin allows the user to provide input to the element that has the risk level exceeding the threshold. At step 624, the security-risk plugin ends the process 600.

Figure 7:
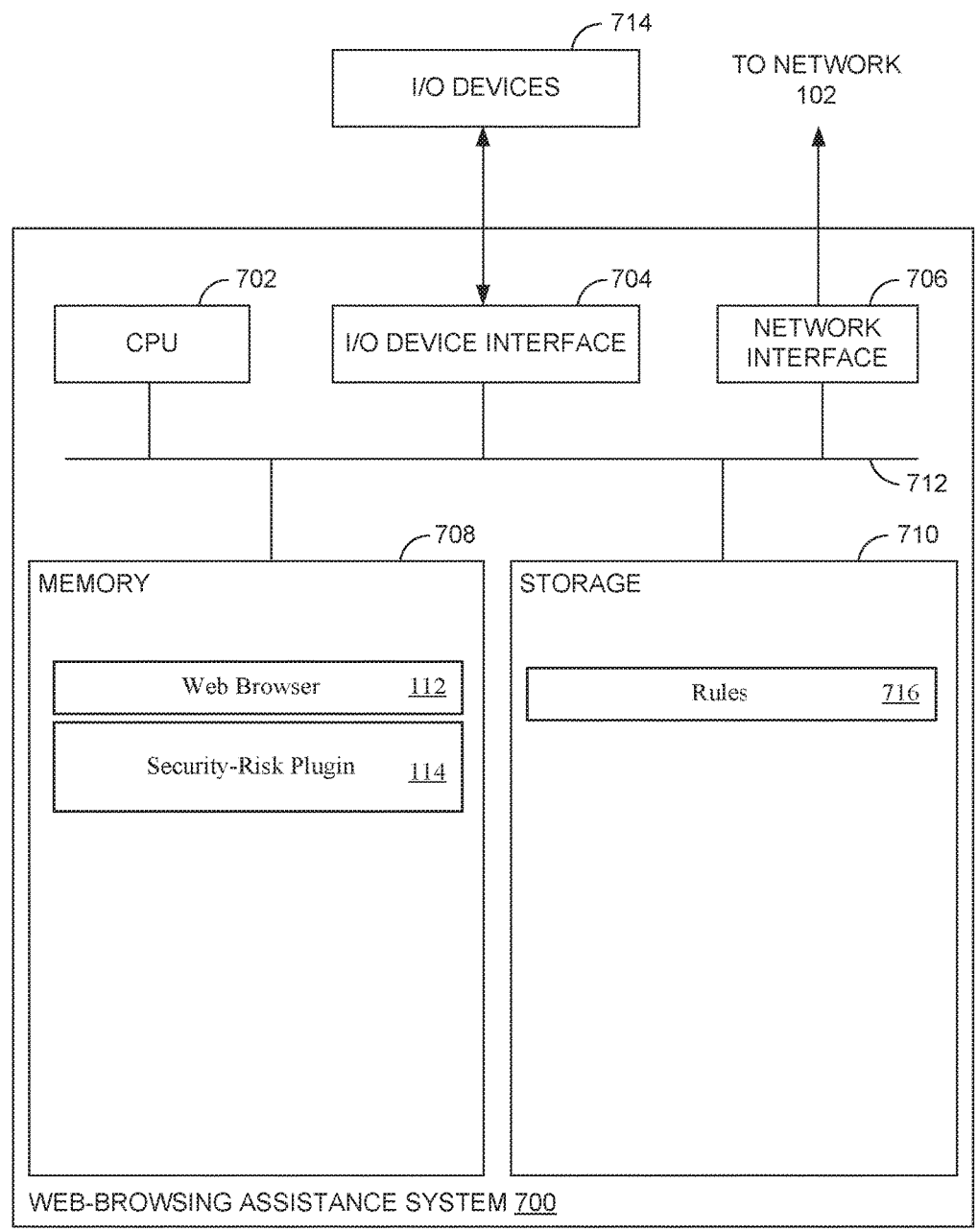
FIG. 7 illustrates an example web-browsing assistance system 700 that helps users decide which information to provide to a web site, according to one embodiment.

FIG. 7 illustrates an example system 700 that helps users decide which information to provide to a web site, according to one embodiment. As shown, the system 700 includes a central processing unit (CPU) 702, one or more input/output (I/O) device interfaces 704 which may allow for the connection of various I/O devices 714 (e.g., keyboards, displays, mouse devices, pen input, etc.) to the system 700, network interface 706, a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 can represent a single CPU, multiple CPUs, a single CPU having multiple processing cores, and the like. Additionally, the memory 706 represents random access memory. Furthermore, the storage 710 may be a disk drive. Although shown as a single unit, the storage 710 may be a combination of fixed and/or removable storage devices, such as fixed disc drives, removable memory cards or optical storage, network attached storage (NAS), or a storage area-network (SAN).

As shown, memory 708 includes a web browser 112 and a security-risk plugin 114. The security-risk plugin 114 can extract textual content from web pages that are loaded into the browser 112. Using the textual content, the security-risk plugin 114 determines a type of information the web page requests and a type of service the web page (or a web site associated with the web page) provides. The security-risk plugin 114 determines a risk level associated with the web page by comparing the type of information requested and the type of service provided to rules 716 that may be stored in the storage 710. The security-risk plugin 114 displays a visual indicator of the risk level.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
   extracting text content from a web page, wherein the web page includes one or more elements supporting input from a user;
   determining, based on the text content, an information type the one or more elements are designed to collect from the user;
   determining, based on the text content, a service type the web page provides;
   determining, based on the information type and the service type, a risk level associated with the web page;
   displaying a visual indicator of the risk level with the web page;
   determining that the risk level meets a predefined threshold;
   disabling the one or more elements based on the risk level;
   sending a message to a designated assistance provider requesting assistance with the one or more elements on behalf of the user;
   activating a remote assistance mode, wherein the remote assistance mode allows the designated assistance provider to control a mouse cursor for the user remotely; and
   streaming a view of a screen displayed to the user to the designated assistance provider.

2. The method of claim 1, further comprising:
   receiving an indication from the designated assistance provider requesting to re-enable one or more elements; and
   re-enabling the one or more elements based on the indication.

3. The method of claim 1, further comprising:
   determining a respective individualized risk level for each of the one or more elements; and
   highlighting each of the one or more elements on the web page according to a coloring scheme, wherein each respective element is highlighted with a respective color that indicates the respective individualized risk level.

4. The method of claim 1, further comprising:
   comparing the service type and the information type to a set of predefined rules, wherein at least one rule maps text to a risk level; and
   determining the risk level associated with the web page based on the comparison of the service type and the information type to the set of predefined rules.

5. The method of claim 1, further comprising:
   determining that the risk level does not meet a predefined threshold; and
   displaying the visual indicator of the risk level to indicate to the user that the risk level does not meet the predefined threshold.

6. A non-transitory computer-readable storage medium containing instructions that, when executed by one or more processors, perform an operation for helping users determine whether it is safe to supply personal information to a web site, the operation comprising:
   extracting text content from a web page, wherein the web page includes one or more elements supporting user-input;

determining, based on the text content, an information type of the user-input that the one or more elements are designed to collect;

determining, based on the text content, a service type the web page provides;

determining, based on the information type and the service type, a risk level associated with the web page;

displaying a visual indicator of the risk level with the web page;

determining that the risk level meets a predefined threshold;

disabling the one or more elements based on the risk level;

sending a message to a designated assistance provider requesting assistance with the one or more elements on behalf of the user;

activating a remote assistance mode, wherein the remote assistance mode allows the designated assistance provider to control a mouse cursor for the user remotely; and streaming a view of a screen displayed to the user to the designated assistance provider.

7. The non-transitory computer-readable storage medium of claim 6, wherein the operation further comprises:

receiving an indication from the designated assistance provider requesting to re-enable one or more elements; and re-enabling the one or more elements based on the indication.

8. The non-transitory computer-readable storage medium of claim 6, wherein the operation further comprises:

determining a respective individualized risk level for each of the one or more elements; and highlighting each of the one or more elements on the web page according to a coloring scheme, wherein each respective element is highlighted with a respective color that indicates the respective individualized risk level.

9. The non-transitory computer-readable storage medium of claim 6, wherein the operation further comprises:

comparing the service type and the information type to a set of predefined rules, wherein at least one rule maps text to a risk level; and determining the risk level associated with the web page based on the comparison of the service type and the information type to the set of predefined rules.

10. A system for helping users determine whether it is safe to supply personal information to a web site, the system comprising:

one or more processors; and a memory storing one or more applications that, when executed on the one or more processors, perform an operation, the operation comprising:

extracting text content from a web page, wherein the web page includes one or more elements supporting user-input, determining, based on the text content, an information type of the user-input that the one or more elements are designed to collect, determining, based on the text content, a service type the web page provides, determining, based on the information type and the service type, a risk level associated with the web page, displaying a visual indicator of the risk level with the web page;

determining that the risk level meets a predefined threshold;

disabling the one or more elements based on the risk level;

sending a message to a designated assistance provider requesting assistance with the one or more elements on behalf of the user;

activating a remote assistance mode, wherein the remote assistance mode allows the designated assistance provider to control a mouse cursor for the user remotely; and streaming a view of a screen displayed to the user to the designated assistance provider.

11. The system of claim 10, wherein the operation further comprises:

receiving an indication from the designated assistance provider requesting to re-enable one or more elements; and re-enabling the one or more elements based on the indication.

12. The system of claim 10, wherein the operation further comprises:

determining a respective individualized risk level for each of the one or more elements; and highlighting each of the one or more elements on the web page according to a coloring scheme, wherein each respective element is highlighted with a respective color that indicates the respective individualized risk level.

13. The system of claim 10, wherein the operation further comprises:

comparing the service type and the information type to a set of predefined rules, wherein at least one rule maps text to a risk level; and determining the risk level associated with the web page based on the comparison of the service type and the information type to the set of predefined rules.

* * * * *